US009055755B2

(12) United States Patent
Richter

(10) Patent No.: US 9,055,755 B2
(45) Date of Patent: Jun. 16, 2015

(54) CONTAINER FOR ACCOMMODATING PRODUCTS DURING A HIGH-PRESSURE TREATMENT

(75) Inventor: Tobias Richter, Memmingen (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 930 days.

(21) Appl. No.: 13/206,092

(22) Filed: Aug. 9, 2011

(65) Prior Publication Data

US 2013/0038010 A1    Feb. 14, 2013

(51) Int. Cl.
*B23Q 3/00*    (2006.01)
*A23L 3/015*   (2006.01)

(52) U.S. Cl.
CPC .................................. *A23L 3/0155* (2013.01)

(58) Field of Classification Search
USPC .............. 269/287, 131; 254/134.3, 134.3 FT;
220/485, 486, 489, 491, 494, 495
See application file for complete search history.

(56) References Cited

U.S. PATENT DOCUMENTS

| | | | | |
|---|---|---|---|---|
| 974,199 A * | 11/1910 | Baxter | ............................. | 99/350 |
| 1,814,378 A * | 7/1931 | Gilbertson et al. | ............ | 383/117 |
| 1,915,196 A * | 6/1933 | McGuire | ........................ | 220/489 |
| 2,575,149 A * | 11/1951 | Watson | ........................ | 220/4.21 |
| 2,620,588 A * | 12/1952 | Critser | ............................. | 43/55 |
| 2,739,734 A * | 3/1956 | Pugh | ............................ | 220/676 |
| 2,898,122 A * | 8/1959 | Beckner | ....................... | 280/28.12 |
| 2,938,450 A * | 5/1960 | Carpenter et al. | .............. | 99/427 |
| 3,315,591 A * | 4/1967 | Elliott | ........................ | 99/421 R |
| 3,372,636 A * | 3/1968 | Marasco | .......................... | 99/427 |
| 3,883,026 A * | 5/1975 | Selz | ................................... | 220/6 |
| 4,203,479 A * | 5/1980 | Mathews | ........................ | 383/95 |
| 4,547,343 A | 10/1985 | Takano et al. | | |
| D293,946 S * | 1/1988 | Grant | ........................... | D30/115 |
| 5,492,243 A | 2/1996 | Brandhorst | | |
| 5,693,350 A | 12/1997 | Fernandez et al. | | |
| 5,932,272 A | 8/1999 | Raemy et al. | | |
| 6,070,554 A * | 6/2000 | Wilson | ........................ | 119/51.04 |
| 6,117,460 A | 9/2000 | Kortschack | | |
| 6,726,045 B1 * | 4/2004 | Chen et al. | .................... | 220/4.34 |
| 7,303,091 B2 | 12/2007 | Lombari | | |
| 7,537,019 B2 | 5/2009 | Ting et al. | | |
| 2006/0257552 A1 | 11/2006 | Hotek et al. | | |
| 2007/0009635 A1 | 1/2007 | Voisin | | |

(Continued)

FOREIGN PATENT DOCUMENTS

AT    365150 B    12/1981
DE    822193 C    11/1951

(Continued)

OTHER PUBLICATIONS

Database WI Week 197811, XP-002621238, Thomson Scientific, London, GB, AN 1978-20975A—Corresponds to SU 557003 A1.

*Primary Examiner* — Lee D Wilson
*Assistant Examiner* — Henry Hong
(74) *Attorney, Agent, or Firm* — Husch Blackwell LLP

(57) ABSTRACT

The invention relates to a container for the accommodation of products during a high pressure treatment of the products, whereby the container comprises an outer wall and a cavity situated within the outer wall for the accommodation of the products. With the container according to the invention at least one section of the outer wall is formed by a large number of mutually coupled chain links, which are arranged in the form of at least one multi-dimensional chain link matrix.

14 Claims, 5 Drawing Sheets

(56) References Cited

U.S. PATENT DOCUMENTS

| | | | |
|---|---|---|---|
| 2007/0212503 A1* | 9/2007 | Watling et al. | 428/35.7 |
| 2008/0260916 A1 | 10/2008 | Kortschack | |
| 2009/0121207 A1* | 5/2009 | Bowerman | 256/25 |
| 2011/0068100 A1 | 3/2011 | Richter | |
| 2011/0123643 A1* | 5/2011 | Biersteker et al. | 424/641 |

FOREIGN PATENT DOCUMENTS

| | | |
|---|---|---|
| DE | 1492367 B1 | 4/1970 |
| DE | 7023578 U | 6/1970 |
| DE | 2026961 A1 | 12/1971 |
| DE | 7207545 U | 5/1972 |
| DE | 2611389 A1 | 9/1976 |
| DE | 9109207 U1 | 11/1992 |
| DE | 4226255 A1 | 2/1994 |
| DE | 3734025 C2 | 11/1994 |
| DE | 19653677 C | 9/1997 |
| DE | 19653677 C1 | 9/1997 |
| DE | 19649952 A1 | 6/1998 |
| DE | 19738800 A1 | 3/1999 |
| DE | 19801031 A1 | 7/1999 |
| DE | 19939677 A1 | 2/2001 |
| DE | 19952611 A1 | 5/2001 |
| DE | 10101958 A1 | 7/2002 |
| DE | 102005011868 A1 | 9/2006 |
| DE | 102009042094 A1 | 4/2011 |
| EP | 0165152 A1 | 12/1985 |
| EP | 0588010 A1 | 3/1994 |
| EP | 0683986 B1 | 11/1995 |
| EP | 0689391 B1 | 1/1996 |
| EP | 0748592 A1 | 12/1996 |
| EP | 1051981 A1 | 11/2000 |
| EP | 0752211 B1 | 10/2001 |
| EP | 1112008 B1 | 5/2002 |
| EP | 1201252 B2 | 5/2002 |
| EP | 1100340 B1 | 9/2004 |
| EP | 1563853 A1 | 8/2005 |
| EP | 1862082 A2 | 12/2007 |
| EP | 2308759 A2 | 4/2011 |
| EP | 2322044 A1 | 5/2011 |
| FR | 895580 A | 1/1945 |
| FR | 2 443 840 A1 | 7/1980 |
| FR | 2542200 A1 | 9/1984 |
| SU | 557003 A1 | 5/1977 |
| WO | 9207478 A1 | 5/1992 |
| WO | 9524932 A1 | 9/1995 |
| WO | 0069475 A1 | 11/2000 |
| WO | 0165946 A1 | 9/2001 |
| WO | 2006097248 A1 | 9/2006 |
| WO | 2006129180 A1 | 12/2006 |

\* cited by examiner

CONTAINER FOR ACCOMMODATING PRODUCTS DURING A HIGH-PRESSURE TREATMENT

TECHNICAL FIELD

The present invention relates to a container for the accommodation of products during the high pressure treatment of these products. The container can accommodate the products, for example during transport to a chamber in which the products are high-pressure treated as well as during the transport out of this chamber. The products may involve packed foodstuffs.

BACKGROUND

Foodstuffs are subject to chemical and biological processes which modify their composition and can also produce substances detrimental to health. For example, the foodstuffs may oxidise or they can be modified by enzymes and micro-organisms, such as mildew. In order that foodstuffs are safe for consumers to eat, can be transported and have the longest possible shelf life, these processes must be prevented or at least delayed within the desired shelf life.

One possibility is to apply a lot of sugar or salt to the foodstuff or to dry it in order to extract the water from the foodstuff and thus to impair the development of micro-organisms such as mildew or bacteria. Also the addition of alcohol, vinegar or preservatives as well as cooling retard the development of micro-organisms and reduce the activity of enzymes. Furthermore, heat treatment can ensure that micro-organisms are killed off and harmful enzymes rendered inactive. During pasteurisation the foodstuff is heated to about 100° C. for a certain period. However, the comparatively resistant bacterial spores continue to be germinable and there is the risk that important nutrients and aromas may be destroyed due to the heat treatment.

Another method of extending the shelf life of foodstuffs is to pack the foodstuff into a gas-tight package and to evacuate the package before closure. Optionally, an inert gas or protective mixtures can be added, for example nitrogen or $CO_2$. Due to the displacement of air, for example of oxygen, the activity of enzymes or micro-organisms is also retarded.

A method at least so far hardly used on an industrial scale is the high pressure treatment of foodstuffs. With this method a normally already packed foodstuff is subjected to very high pressures of typically 400 MPa to 600 MPa over a certain time span, for example for a few minutes. These high pressures ensure that harmful micro-organisms in the foodstuff are destroyed and killed off. Smaller molecules however, such as vitamins, which determine the taste and nutritional value of the foodstuff, are hardly influenced by the high pressure treatment. With meat products the shelf life can be extended, for example, by a factor of six to ten in comparison to the untreated product.

Compared to heat treatment, high pressure treatment has various advantages. For example, the taste is hardly changed and the vitamin content in the foodstuff after high pressure treatment is often twice as high than after a heat treatment. Some heat-sensitive products, for example sea food, cannot be heat-treated at all. Pathogenic germs, such as listeria, can be reliably killed off, so that food safety is increased. High pressure treatment can however also specifically influence the internal structure of the foodstuff, so that novel product possibilities arise, for example, through the gelification of fruit preparations without heat. Finally, the technology regarding high pressure treatment is already recognised in many countries as safe (for food).

During the high pressure treatment of packaged foodstuffs problems can occur with the packaging due to the process conditions. For example, visually disadvantageous changes and also damage can occur. Particularly packages with an inert gas atmosphere give problems due to the significantly compressible gas content in the package. This is also one reason that so far mainly vacuum packaging has been used in high pressure treatment.

The inactivation of micro-organisms and the structural modification of foodstuff constituents are for example described in EP 0 588 010 A1, EP 0 689 391 B1, EP 0 752 211 B1, EP 1 100 340 B1, DE 42 26 255 A1, and DE 37 34 025 C2. EP 1 112 008 B1, EP 1 201 252 B1, DE 196 49 952 A1, DE 197 38 800 A1, DE 199 39 677 A1 and DE 26 11 389 A1 describe the effects of the high pressure treatments on the microbiological shelf life and food safety. The use of high pressure treatment particularly on meat products is described in DE 198 01 031 C2, DE 196 53 677 C1, EP 0 748 592 B1, EP 0 683 986 B1, DE 101 01 958 A1, DE 10 2005 011 868 A1, or WO 2006/097248 A1.

A system for the high pressure treatment of foodstuffs is furthermore known from WO 2006/129180 A1. Here, an autoclave is provided with a high-pressure chamber in which the foodstuffs are subjected to a high pressure. The autoclave must be closed to establish the pressure. Consequently, the system cannot be operated continuously. In order to increase the throughput of the system it is typically operated using a batch method in which the products are introduced into the autoclave in groups, treated under high pressure and removed.

In order to be able to charge and discharge the autoclave more quickly and thus shorten the cycle time, the products to be treated are normally put into a container. When the high-pressure chamber is free, one or optionally several containers can be moved into the high-pressure chamber, for example in that the containers are moved by means of a slide. Following the high pressure treatment the containers are removed from the autoclave, for example, in that they are pushed out on the side opposite the entry opening.

A transport container for accommodating products during a high pressure treatment, which is limited with regard to filling, emerges from DE 199 52 611 A1. A generic container for the same purpose as the container of the present invention furthermore emerges from DE 10 2009 042 094 A1 or from EP 2 322 044 A1 which is parallel to it.

Containers, which are suitable for accommodating products during a temperature sterilisation, but would not withstand a high pressure treatment, are known for example from EP 0 165 152 A1, WO 95/24932 A1 or FR 2 542 200 A1. Further containers for completely different purposes, which would also not withstand a high pressure treatment, are known for example from DE 70 23 578, AT 365 150, DE 822 193, DE 72 07 545 or DE 91 09 207 U1.

SUMMARY

The object of the invention is to make a container available for accommodating products during a high pressure treatment, which with the most constructively simple means possible is improved with regard to its durability and to the most efficient high pressure treatment possible for the products it contains.

A container according to the invention, which can be designated as a transport container due to its properties for transporting products, is characterised in that at least one section of its outer wall is formed by a large number of mutually connected or coupled chain links which are arranged in the form of a multi-dimensional chain link matrix. Here, the expression "multi-dimensional chain link matrix" signifies that the chain links are arranged adjacent to one another in many different spatial directions. In particular it is conceivable that both in a longitudinal direction or axial direction of the container and in a circumferential direction of the container a plurality of mutually coupled chain links are arranged adjacently or consecutively. Here, it is quite possible that many adjacent chain links are for example coupled comparatively rigidly together in the axial direction of the container, whereas adjacent chain links or groups of chain links are pivotably coupled together in the circumferential direction of the container.

Overall the container according to the invention offers many advantages for the accommodation of products during a high pressure treatment. For example, it is possible that a high pressure medium, usually water, can flow into the container or out of the container after the high pressure treatment through openings in the individual chain links and/or between adjacent chain links. Due to the large number of openings available, the inward and outward flow of the high pressure medium can take place comparatively quickly, which shortens the high pressure treatment time. In addition, the use of a multi-dimensional chain link matrix facilitates a certain flexibility in the shape of the outer wall of the container. This flexibility within certain limits enables the container to react to local pressure differences and thus prevents a premature fatigue fracture. In this way the container exhibits a very long service life.

Charging and discharging the container is simplified if the container comprises a first container part and a second container part which can pivot open and closed about a hinge relative to one another. In particular each of the two container parts could have a semi-cylindrical shape in the manner as described in DE 10 2009 042 094 A1, so that both container parts together form a cylindrical container. Also dividing the container shape into several container parts is conceivable, whereby an overall cylindrical shape of the complete container is preferred.

Furthermore, it is expedient if a retaining clamp is provided at least on one of the container parts. This is used to secure the products accommodated in the respective container part and to prevent them from falling out when the two container parts are brought together forming one closed container.

With a multi-dimensional chain link matrix of the container according to the invention it is in particular possible that the chain links extend transversely to a direction of a hinge or pivot axis defined by the hinge, i.e. normally in the circumferential direction of the container. This leads to an advantageous, slight variability of the circumferential shape of the container when adjacent chain links or groups of chain links move against one another.

In an advantageous variant of the invention a group of chain links coupled together extends from one container part to the other container part. Consequently, the chain links have a dual function. They not only form at least sectionally the outer wall of the container, but rather they are also used to fasten the two container parts to one another.

It is particularly advantageous if this fastening of the two container parts to one another is produced in that the hinge is formed by one or a plurality of chain links so that the first container part can pivot open and closed relative to the second container part.

Further advantages arise if a retaining blade is provided on at least one chain link forming the hinge. This can successfully prevent an undesired opening of a retaining clamp provided on the container part when the relevant container part has been pivoted by a predetermined minimum angle relatively towards the other container part. The advantage here is that this retaining effect of the retaining blade occurs automatically without an additional element such as for example a lock on the retaining clamp which must be actively closed. It is also advantageous that the retaining blades protruding from the hinge in no way impair the retaining clamp from pivoting out in the open position of the container.

As a further optional feature, the invention caters for the provision of longitudinal bars which extend in each case through articulated points between a first group of a plurality of chain links and an adjacent second group of a plurality of chain links. These longitudinal bars define the position of the joint between the two groups of chain links and increase the stability of the outer wall of the container.

It is furthermore conceivable that at least one container part has a frame, comprising two face plates closing off the container part and at least one frame part joining the face plates. Additional joints between the two face plates can be provided by longitudinal bars if they are present. The frame has the advantage of again significantly increasing the stability of the shape of the container. Depending on the shape of the container parts, the face plates can each be formed approximately in a semicircular shape.

A further increase in the container stability can be achieved in that at least one container part has one or a plurality of supporting yokes. They can be arranged, for example, at equidistant spacings between the two face plates.

If longitudinal bars are present, it is advantageous if each of the ends of at least some longitudinal bars is fitted to one of the face plates or to a supporting yoke. In another variant the longitudinal bars extend through holes in the supporting yokes so that each of the two ends of the longitudinal bars is fitted to one of the two face plates. The fitting can occur in that the longitudinal bars are inserted into blind holes in the face plates. However, it is more favourable if the longitudinal bars extend through holes in the face plates and have a widened head on the outer side of the face plates so as to prevent the longitudinal bars sliding through the holes in the face plates. For this purpose the outer end of the longitudinal bar could for example be deformed by the action of a force and/or heat in order to form the head.

Preferably, an elongated hole, which offers many different functions and advantages, is provided in one face plate. This elongated hole can be used to grasp the container manually or by a gripper system and to transport it or relocate it. In order to facilitate manual grasping, the elongated hole should be preferably dimensioned such that an operator with a normally sized hand can comfortably grasp in it. For this purpose an elongated hole with a length of about 9 to 12 cm and a height of approx. 2 to 3 cm would be suitable. The elongated holes also have the purpose in that the pressure medium (normally water) can quickly flow out of the container at the end of a high pressure treatment through the elongated holes before the container is removed from the high-pressure chamber. In addition, the elongated holes could be used for centring the containers in the correct position, for example, on a closure station or for supporting the opening and closing of the container parts.

Furthermore, it can be advantageous if the container comprises a locking mechanism for releasably locking a plurality of container parts in a closed position of the container. This ensures that the container cannot unintentionally open again and lose products when it is in its closed position. Consequently, the product transport is simplified with the container.

In a particularly simple embodiment variant the locking mechanism comprises a plugged joint between the two container parts, for example a tongue and groove joint. In addition or alternatively a releasable lock could also be provided.

Plastic has been shown to be particularly favourable as a material for the chain links, face plates, frame parts, longitudinal bars, supporting yokes and/or the components of the locking mechanism. With regard to its stability and elastic properties the plastic should be able to withstand the extremely high pressures of up to 6000 bar during the high pressure treatment. If foodstuffs are involved as the products intended for the high pressure treatment, it would also be advantageous if the plastic is approved for contact with foodstuffs. However, this requirement is not essential, because the products are generally already packed before they are high-pressure treated. Acetal thermoplast (PA) has been shown to satisfy all these requirements.

Other than that, it is particularly advantageous if all plastic parts of the container and where possible even all the components of the container, are formed from the same plastic. This is because it ensures that all the relevant components are equally suitable for withstanding the extremely high pressures, so that a fatigue fracture cannot occur first on components with a weaker material.

In the following an advantageous embodiment of the invention is explained in more detail with reference to the below drawings.

DETAILED DESCRIPTION

Figure 1:
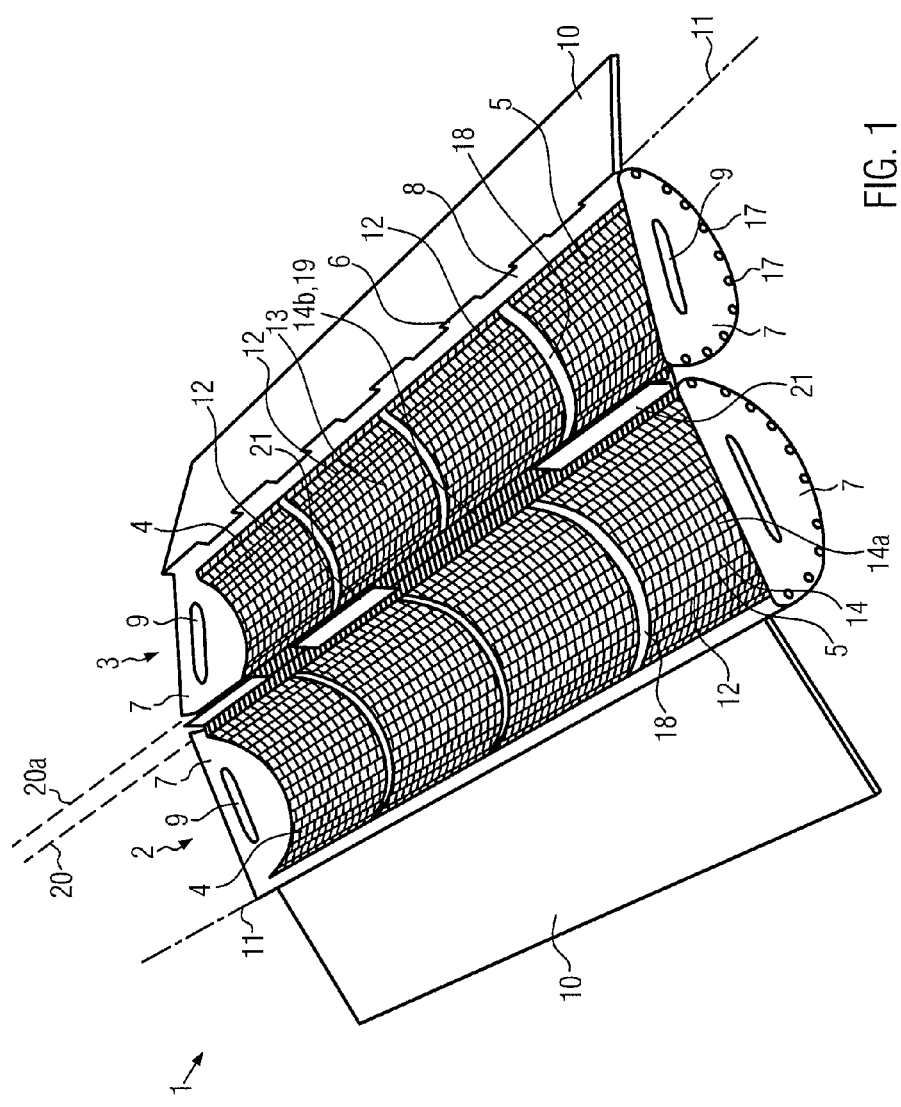
FIG. 1 is a perspective view of a container according to the invention in an open position.

In the figures identical components are designated with the same reference numerals throughout.

FIG. 1 illustrates a perspective view of an embodiment of a container 1 according to the invention. The container 1 comprises a first container part 2 and a second container part 3 which each have a semi-cylindrical shape and can also be designated as the container lower part 2, and the container upper part 3, respectively. Each of the two container parts 2, 3 has a semi-cylindrically shaped cavity 4, which is provided for accommodating products during a high pressure treatment of these products, and which is delimited by a semi-cylindrically shaped outer wall 5.

Each of the two container parts 2, 3, which are constructed symmetrically to one another, have a frame 6 which gives stability to the container part 2, 3. In the plan view on the open container parts 2, 3 this frame 6 is approximately C-shaped. At each of the two axial ends of the respective container parts 2, 3 it comprises an approximately semicircular face plate 7 as well as a longitudinal frame part 8, which joins both face plates 7 of the container part 2, 3, on the longitudinal side in each case facing away from the other container part 2, 3.

In each face plate 7 an oval or approximately rectangular elongated hole 9 is provided aligned parallel to the straight edge of the face plate 7. The dimensions of the elongated hole 9 are (just) large enough that an operator of the container 1 can comfortably grasp through it with his hand. For example, the elongated hole 9 could have a length of 10 cm and a height of 2.5 cm.

A plate-shaped, rectangular retaining clamp 10 is pivotable about a pivot axis 11 on the frame member 8 of each of the two container parts 2, 3. In FIG. 1 each of the container parts 2, 3 is displayed in its open position in which the retaining clamp 10 is pivoted outwards. The retaining clamp 10 can however be pivoted inwards about the pivot axis 11 in order to close off the cavity 4 of the container part 2, 3 filled with products at the top and to prevent products falling out of the cavity 4 unintentionally. The pivot axis 11 is aligned parallel to a longitudinal or axial direction of the container parts 2, 3 or of the complete container 1.

Figure 5:
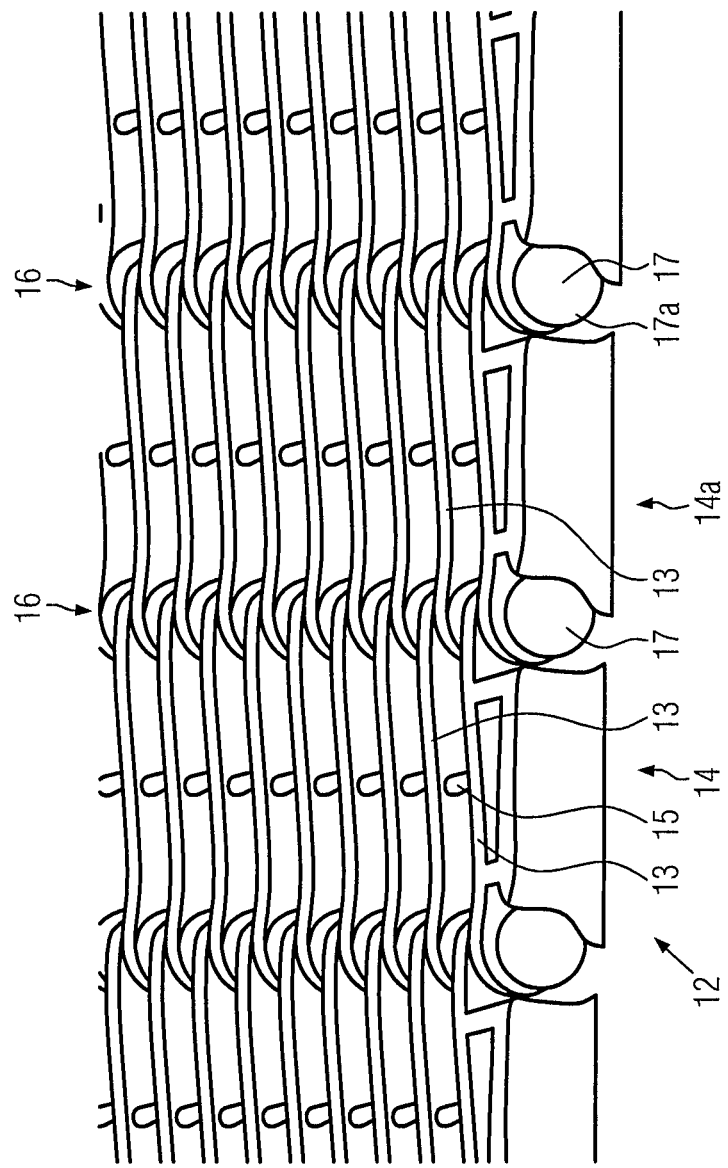
FIG. 5 is a perspective view of a section from the multi-dimensional chain link matrix used for the outer wall of the container according to the invention.

According to the invention provision is furthermore made in that the main part of the outer wall 5 of the container 1 is formed by an—in this embodiment curved, two dimensional—multi-dimensional chain link matrix, which for its part comprises a large number of mutually coupled chain links 13. The structure of the chain link matrix 12 is particularly clear in FIG. 5 which illustrates a section of the chain link matrix 12 in an extended or flat arrangement of the chain links 13. The chain link matrix 12 comprises chain link groups 14, 14a, which each have a large number of chain links 13 lying one behind the other in the longitudinal direction of the container 1 and are joined together comparatively rigidly by a ridge 15. Each chain link 13 here extends in the transverse direction of the container 1 between a first and a second articulated point 16 which are each formed by holes in the end sections of the chain links 13.

At the articulated points 16 a longitudinal bar 17 penetrates alternately the holes of the chain links 13 of a first chain link matrix 14 and of an adjacent, second chain link matrix 14a. The two adjacent chain link matrices 14, 14a are therefore pivotable relative to one another about this articulated point 16 or about the longitudinal bar 17. Through this pivoting action the chain link matrix 12 can be brought from the extended or flat shape in FIG. 5 into the semicircular curved shape illustrated in FIG. 1. Other than that, each of the longitudinal bars 17 has at each of its two ends a widened head 17a, which prevents the chain links 13 sliding down from the longitudinal bar 17. Chain links of this nature are available from the company Intralox and are also designated as Intralox belts. They have been used primarily so far as endless conveyor belts.

Returning to FIG. 1: Here it can be seen that the outer wall 5 of the container 1 has four chain link matrices 12 arranged one behind the other in the longitudinal direction of the container 1. Each of the chain link matrices 12 extends over both container parts 2, 3, namely from the frame part 8 of the first container part 2 to the frame part 8 of the second container part 3. Here, each chain link matrix 12 comprises a large number of chain link groups 14, 14a which are joined together at articulated points 16 using longitudinal bars 17. The longitudinal bars 17 extend in the axial or longitudinal direction of the container 1, whereas adjacent chain link groups 14, 14a are located next to one another in the transverse direction or circumferential direction of the container 1. Each chain link group 14, 14a comprises for its part a large number of chain links 13, which for their part are aligned in their transverse direction or the circumferential direction of the container 1.

Between the face plates 7 of each container part 2, 3 there are semicircular supporting yokes 18 on equidistant spacings. Whereas the outer ends of each supporting yoke 18 are joined to the frame part 8 or are formed in one piece with the frame part 8, a longitudinal bar 17 passes through the oppositely situated, inner ends of the supporting yokes 18 of the container part 2, 3. Also the other longitudinal bars 17 extend through the face plates 7, through the articulated points 16 between mutually adjacent chain link groups 14, 14a, through the supporting yokes 18 and finally through an opening or hole in the oppositely situated face plate 7. The outer ends of the longitudinal bars 17 are formed or deformed as widened heads 17a so that the longitudinal bars 17 cannot slide inwards out of the face plates 7.

A hinge or hinge region 19 is formed between the two container parts 2, 3. This hinge 19 enables the two container parts 2, 3 to pivot from the open position (FIG. 1) into a closed position (FIG. 4) in order to close the container 1. The hinge 19 is formed by the respective four central chain link groups 14b of all four chain link matrices 12 arranged behind one another in the longitudinal direction of the container 1. The articulated points 16 of these central chain link groups 14b are each located on the longitudinal bar 17 which passes through the outer ends of the supporting yokes 18 of the respective container part 2, 3. This enables the central chain link groups 14b to be no longer bound to the predetermined semi-cylindrical shape of the respective container part 2, 3, but can instead pivot relatively to this semi-cylindrical shape. In this way the hinge 19 forms two hinge axes 20, 20a which each extend through the oppositely situated articulated points 16 of the central chain link groups 14b. These hinge axes 20, 20a are located parallel to the axial or longitudinal direction of the container 1.

On at least one, preferably a plurality (in the present embodiment on three) or even on all the chain link groups 14b forming the hinge region 19, retaining blades 21 located perpendicular to the chain link group 14b protrude upwards. The function of this retaining blade 21 is explained further below.

Figure 2:
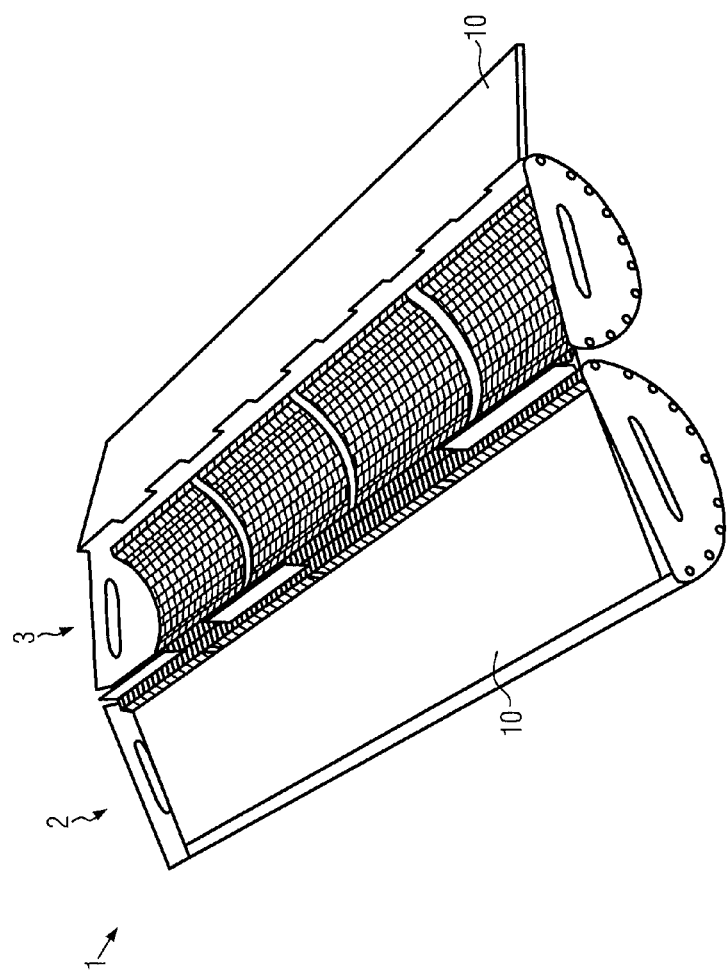
FIG. 2 is a perspective view of the container after the closure of a first retaining clamp.

FIG. 2 illustrates the container 1 in a furthermore open position. For the elucidation of the function of the retaining clamp 10 however, the retaining clamp 10 of the first container part 2 has been pivoted inwards in order to cover the cavity 4 of the first container part 2.

Figure 3:
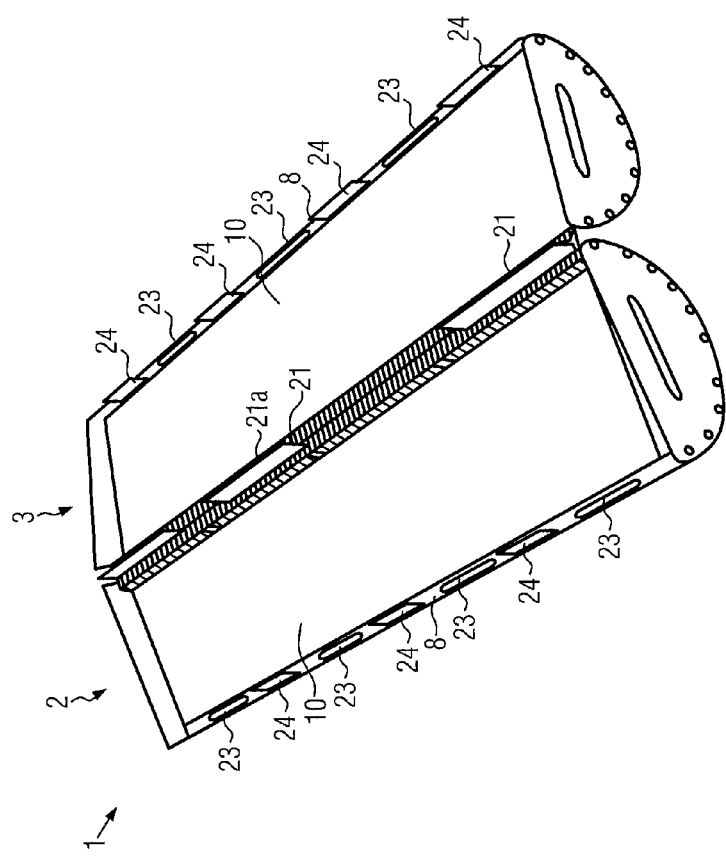
FIG. 3 is a perspective view of the container after the closure of the second retaining clamp.

FIG. 3 shows the container 1 in a position in which the retaining clamp 10 of the other, second container part 3 has now also been pivoted inwards in order to close off the cavity 4 of this second container part 3 at the top. The retaining clamps 10 here have been pivoted inwards in each case about their pivot axes 11.

Based on FIG. 3 the function of the three retaining blades 21 can now be appreciated. If namely, starting from the still open position of the container 1 illustrated in FIG. 3, the two container parts 2, 3 are pivoted towards one another, from a certain pivot angle about the hinge axis 20, 20a (for example at an angle in the range from 10° to 20°) this leads to the distance between the pivot axis 11 of the retaining clamp 10 and the upper edge 21a of the retaining blade 21 becoming smaller than the width of the relevant retaining clamp, i.e. the distance between the pivot axis 11 of the retaining clamp 10 and its longitudinal edge pointing to the hinge 19. From this pivot angle the retaining clamp 10 can no longer pivot open past the retaining blade 21. Automatically and without the requirement of operating a further locking element, the retaining clamp 10 is thus secured in its position closing the container part 2, 3. Also automatically, the retaining clamp 10 is released again on opening the container 1 once the container 2, 3 has been pivoted open enough with respect to the hinge region 19. The retaining blades 21 thus present a very simple, but automatically effective method of releasably locking the retaining clamps 10.

Figure 4:
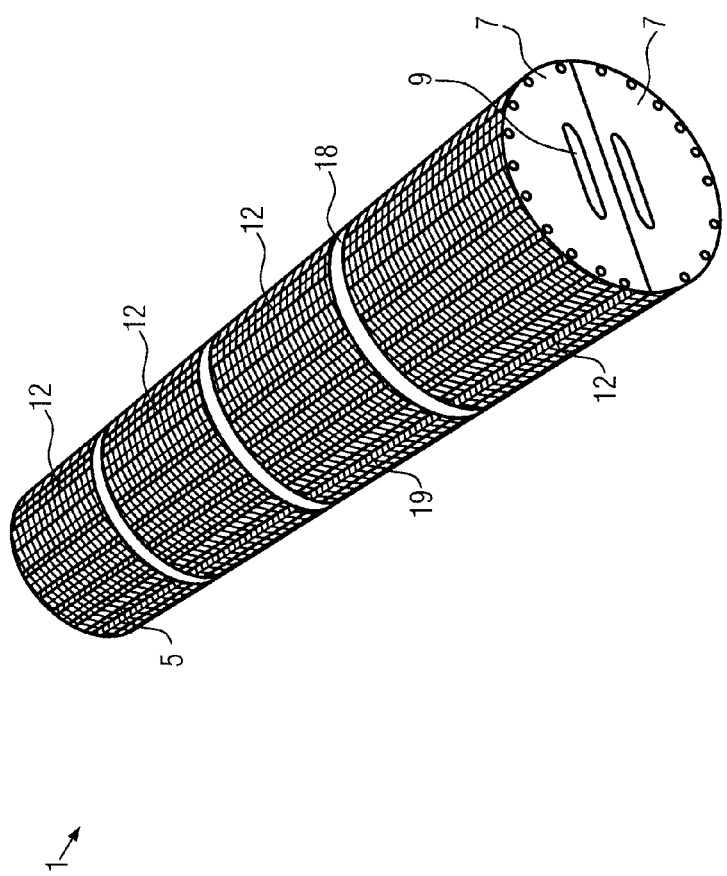
FIG. 4 is a perspective view of a container in a closed position.

An additional locking mechanism 22 is used for releasably locking the two container parts 2, 3 together in a closed position of the container 1 (refer to FIG. 4). The container 1 is brought to the closed position according to FIG. 4 in that the two container parts 2, 3 are pivoted towards one another around the hinge region 19. In the illustrated embodiment the locking mechanism 22 is formed as a plug connector between the two container parts 2, 3. For this purpose each container part 2, 3 has an alternating arrangement of grooves 23 and tongues or protrusions 24 on the upper side of its frame part 8. The frame part 8 of in each case the other container part 2, 3 has a complementary arrangement of grooves 23 and tongues 24. When the two frame parts 8 come into contact with one another, the grooves 23 of one container part 2 engage with the tongues 24 of the other container part 3 and vice versa. In this way the two container parts 2, 3 are releasably secured to one another. Complementary grooves 23 and tongues 24 can also be provided on the upper edges of the face plate 7 which come into contact with one another.

In the illustrated embodiment of the container 1 all the parts of the container 1 consist of the same plastic, preferably of an extremely stable acetal thermoplast (PA) which is also approved for use with foodstuffs.

Starting from the illustrated embodiment, the container 1 according to the invention can be modified in many ways. It has already been indicated that the container 1, for example, can also only have a retaining clamp 10 on one of the two container parts 2, 3 or even have no retaining clamp 10. In addition a different mechanism for holding a retaining clamp 10 in its closed position could be provided which comprises more or also less retaining blades 21 or other elements such as locks or bolts. Also the locking mechanism 22 for the whole container 1 can be omitted or formed differently, for example also in the form of one or several locks or bolts.

The invention claimed is:

1. A container for accommodating products during a high pressure treatment of the products, the container comprising:
    an outer wall and a cavity situated within the outer wall for accommodating the products, the outer wall having at least one section that is formed by multiple mutually coupled chain links, which are arranged in the form of at least one multi-dimensional chain link matrix;
    wherein the container comprises a first container part and a second container part, which are relatively pivotable to and away from one another about a hinge; and
    wherein the hinge is formed by one or a plurality of the chain links and at least one chain link that forms the hinge includes a retaining blade.

2. The container according to claim 1 wherein the first container part and the second container part-being pivotally coupled by a hinge configured to rotate about a hinge axis, said hinge axis extending in the longitudinal direction of the cylindrical container.

3. The container according to claim 2 further comprising a retaining clamp provided on at least one of the container parts.

4. The container according to claim 2 wherein the chain links extend transversely to the direction of the hinge axis.

5. The container according to claim 2 wherein at least one of the at least one chain link matrix extends from one container part to the other container part.

6. The container according to claim 1 further comprising multiple longitudinal bars, wherein each longitudinal bar extends through holes on one end of a chain link of a first group of a plurality of the chain links and through holes on one end of a chain link of an adjacent second group of a plurality of the chain links to pivotally couple the first group of a plurality of chain links and the second group of a plurality of chain links at an articulating point.

7. The container according to claim 2 wherein at least one container part has a frame comprising two face plates closing the at least one container part and at least one frame part joining the face plates.

8. The container according to claim 2 wherein at least one container part has one or a plurality of supporting yokes.

9. The container according to claim 6 wherein at least one of the first and second container parts has a frame comprising two face plates that close opposing ends of the at least one of the first and second container parts, at least one frame part that joins the face plates, and at least one supporting yoke, and wherein at least one of the longitudinal bars is fitted to at least one of the face plates or to the at least one supporting yoke.

10. The container according to claim 7 wherein at least one of the face plates has an elongated hole.

11. The container according to claim 1 wherein the container further comprises a locking mechanism for the releasable locking of the container parts in a closed position of the container.

12. The container according to claim 11 wherein the locking mechanism comprises a plug connector and/or a lock.

13. The container according to claim 9 wherein the chain links, the face plates, the at least one frame part, the longitudinal bars, and the at least one supporting yoke are formed of plastic.

14. The container according to claim 13 wherein the chain links, the face plates, the at least one frame part, the longitudinal bars, and the at least one supporting yoke are formed of the same plastic.

\* \* \* \* \*